United States Patent [19]

Schlienger

[11] Patent Number: 5,532,448

[45] Date of Patent: Jul. 2, 1996

[54] SYSTEM FOR FEEDING TOXIC WASTE DRUMS INTO A TREATMENT CHAMBER

[75] Inventor: Max P. Schlienger, Ukiah, Calif.

[73] Assignee: Lockheed Environmental Systems & Technologies Co., Houston, Tex.

[21] Appl. No.: 398,610

[22] Filed: Mar. 6, 1995

Related U.S. Application Data

[62] Division of Ser. No. 208,159, Mar. 9, 1994, Pat. No. 5,410,121.

[51] Int. Cl.$^6$ .................................................. B23K 10/00
[52] U.S. Cl. ............................. 219/121.43; 219/121.58; 219/121.37; 219/121.44; 110/242; 110/346; 294/113; 294/115; 588/900; 414/753
[58] Field of Search .................... 219/121.36, 121.37, 219/121.38, 121.44, 121.39, 121.48, 121.43, 121.59, 121.49, 121.58; 110/242–250, 346, 236; 294/113, 115, 116, 118; 588/900; 414/753, 754, 752; 373/18–22

[56] References Cited

U.S. PATENT DOCUMENTS

| | | | |
|---|---|---|---|
| 1,733,547 | 10/1929 | Lorenz | 414/753 |
| 3,885,825 | 5/1975 | Amberg et al. | 294/115 |
| 4,151,983 | 5/1979 | Stock et al. | 294/66 A |
| 4,419,943 | 12/1983 | Faurholdt | 110/237 |
| 4,475,860 | 10/1984 | Okamoto et al. | 414/416 |
| 4,893,982 | 1/1990 | Yamaguchi | 414/753 |
| 5,042,962 | 8/1991 | Lechnir | 414/452 |

*Primary Examiner*—Mark H. Paschall
*Attorney, Agent, or Firm*—Townsend and Townsend and Crew

[57] ABSTRACT

A drum is introduced into an interlock chamber and the interlock chamber is sealed. A door leading to a transition chamber is opened and the drum is moved into the transition chamber. The transition chamber is contained within a spool valve which includes a pair of drum grips. The drum grips are actuated to grasp the drum. The drum grips are rotatably coupled to an inner element of the spool valve. The inner element is rotated with respect to a housing and a drum manipulator grasps an end of the drum. The drum is displaced from the transition chamber toward a treatment chamber. The drum is cut into a desired shape and/or number of pieces with the drum and the material contained therein being deposited into the treatment chamber.

11 Claims, 5 Drawing Sheets

SYSTEM FOR FEEDING TOXIC WASTE DRUMS INTO A TREATMENT CHAMBER

This is a division of application Ser. No. 08/208,159, filed Mar. 9, 1994, now U.S. Pat. No. 5,410,121.

BACKGROUND OF THE INVENTION

The present invention relates to an apparatus and method for feeding drums into a treatment chamber. The invention is described with reference to a plasma arc treatment chamber; however, any other type of treatment chamber may also be used.

In plasma arc treatment chambers a plasma torch transfers electrical energy through a stream of ionized gas so that the gas becomes an electrical conductor. With such a torch, temperatures of as much as 10,000° C.–15,000° C. can be attained. Generally speaking, a plasma torch disposal reactor raises the temperature of waste materials to such high levels that they chemically break down (pyrolysis). This breakdown can be enhanced by maintaining an atmosphere of appropriate gas in the incinerator. As a result, the residues are usually harmless gases and solids which can be suitably removed from the incinerator.

The commonly owned U.S. Pat. No. 4,912,296, for example, discloses an advantageous construction for a plasma torch incinerator. U.S. Pat. No. 4,770,109 and U.S. Pat. No. 5,136,137, both by the inventor of this application and also commonly owned, disclose and claim reactors for the incineration and melting of all types of materials, particularly hazardous waste, with which the invention of this application is particularly useful. The term hazardous waste as used herein refers to any type of toxic, nuclear, chemical, and/or biological waste. The disclosure of the commonly owned patents are incorporated herein by reference.

Other patents relating to the field of materials incineration and melting include U.S. Pat. Nos.:
3,599,581
3,779,182
4,181,504
4,326,842
4,432,942
4,582,004
4,615,285
4,918,282
and British Patent No. 1,170,548.

The reactor disclosed in the '137 patent uses a rotating, material-receiving drum or chamber into which the hot plasma of a plasma torch is directed. The inner surface profile of the rotating drum is appropriately shaped and constructed so that by varying the speed of rotation of the drum, materials placed into it are spread out over the inner surface of the drum in a relatively thin layer. The large surface area produced can be brought more quickly to the desired high temperatures generated by the plasma torch. The center of the drum forms a discharge opening through which incinerated and melted materials can be gravitationally withdrawn from the drum. The '137 patent discloses in detail how the material in the drum is melted and how the drum is constructed and operated for withdrawing the molten material.

U.S. Pat. No. 5,136,137 also discloses a known apparatus for introducing waste material into a treatment chamber. The treatment chamber has a material inlet 22 (FIG. 3A). A plunger valve 160 is coupled to the material inlet 22 at one end and to a screw feeder 161 at the other end. A thrasher 162 is attached to the inlet of the screw feeder 11. In use, a storage drum 163 containing hazardous waste is introduced into a container lock 164 which is coupled to a drum tipple 165. Waste material from the drum 163 is directed through lock 164, into thrasher 162, through screw feeder 161, past plunger valve 160 and into the reactor through pipe 22.

A problem with the method described in U.S. Pat. No. 5,136,137 is that the drum is opened outside of the treatment chamber thereby contaminating the area in which the drum is opened. The container lock 164 is exposed to the contents of the drum and must be decontaminated. A further problem with the conventional method is that the empty drum must be decontaminated and disposed of independently.

SUMMARY OF THE INVENTION

The present invention solves the problems with prior art apparatus and methods of feeding toxic waste drums into a treatment chamber. The drum is introduced into the treatment container before being opened so that contamination of an outside area does not occur. The present invention also provides a method for disposing of the drum itself thereby eliminating the need to independently decontaminate and/or dispose of the empty drum.

A drum containing hazardous waste is introduced into a transition chamber can be isolated from the outside environment. Once the drum is inside the transition chamber, the transition chamber is coupled to the treatment chamber and the drum is displaced from the transition chamber into the treatment chamber. The drum is preferably displaced from the transition chamber by a drum manipulator which is described in greater detail below.

The drum is preferably cut open before being treated so that the contents of the drum and the drum itself can be deposited into the treatment chamber in controlled quantities. The cutting device is preferably a plasma torch but may be any conventional cutting device. The cutting device is preferably held stationary while the drum is manipulated into cutting position by the drum manipulator.

The transition chamber is preferably sealed from the outside environment via an interlock chamber. The drum is first introduced into the interlock chamber and the interlock chamber is sealed. A chamber door, which separates the interlock chamber from the transition chamber, is then opened and the drum is moved into the transition chamber. An advantage of providing the interlock chamber is that a second drum can be readied for disposal while the first drum is being disposed of. During the time the first drum is being disposed of, the interlock chamber is evacuated or purged with the purged or evacuated gas being fed into the treatment chamber. After the interlock chamber has been purged or evacuated, the second drum is moved into the interlock chamber and the interlock chamber is sealed so that the second drum is ready for disposal. When the first drum has been completely disposed of in the treatment chamber, the second drum is ready to be moved into the transition chamber.

The transition chamber is preferably contained within a spool valve. The spool valve includes an inner element which is rotatable with respect to a housing. The housing has four outlets oriented 90° from each other and the inner element has two ports disposed 180° from each other. Depending upon the particular angular orientation of the inner element, two opposing outlets of the housing are coupled through the ports of the inner element.

The spool valve includes a pair of drum grips which are configured to grasp the drum. The drum grips are rotatably coupled to the inner element through the central pivots of the inner element so that the drum grips and inner element rotate together with respect to the housing. The drum is introduced into the transition chamber in an upright position. The drum grips are then actuated to grasp the drum and the inner element is rotated 90° thereby rotating the drum from the upright position into a horizontal position. The drum manipulator is actuated to grasp the drum and introduce the drum into the treatment chamber in the horizontal position.

The preferred drum manipulator includes a pair of jaws each having a recess configured to engage a raised lip of the drum. The drum manipulator has an inner member which is at least partially disposed within an outer member. The inner and outer members are movable relative to one another between first and second positions. The jaws are coupled via a linkage to the inner and outer members so that the jaws move between open and closed positions when the inner member and outer member move relative to one another between the first and second positions.

The drum manipulator also preferably includes a drum contact surface that is cooled. The cooled drum contact surface keeps the drum from becoming too hot when using treatment chambers operating at high temperatures. If the drum becomes too hot, the drum can begin to flow and fall from the grasp of the drum manipulator before the drum has been manipulated in the desired manner.

Other features and advantages of the invention will appear from the following description in which the preferred embodiments have been set forth in detail in conjunction with the accompanying drawings.

DESCRIPTION OF THE PREFERRED EMBODIMENT

Figure 1:
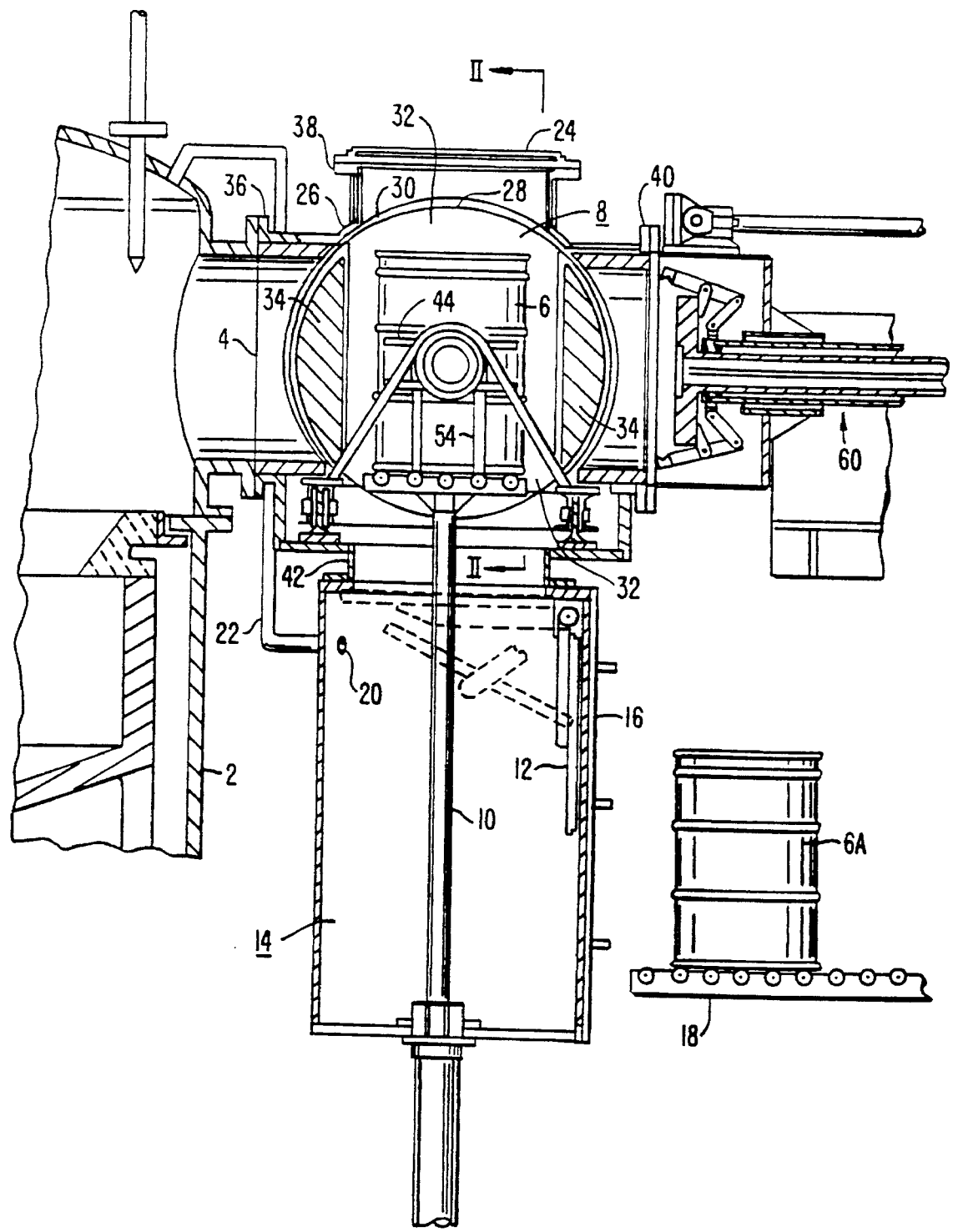
FIG. 1 is a vertical section of a drum feeding apparatus with a spool valve in a loading position.

A treatment chamber 2 for treating hazardous waste is shown in FIG. 1. The treatment chamber is a plasma arc treatment chamber; however, the present invention may be used with any type of treatment chamber. The treatment chamber 2 includes an entrance port 4 through which waste material is introduced into the treatment chamber 2.

A drum feeding apparatus is coupled to the entrance port 4. The drum feeding apparatus is adapted to receive drums 6 containing hazardous waste and feed the drums 6 into the treatment chamber 2 while preventing the escape of hazardous materials during the feeding operation.

Adjacent the entrance port 4 is a transition chamber 8 containing a drum. The drum 6 is introduced into the transition chamber 8 with a lift 10, however, any other drum positioning device may be used such as a conveyor, grapple, or vacuum type holder. A door 12, preferably a flapper gate, is provided for sealing the transition chamber 8. The door 12 preferably provides a vacuum-tight seal.

The transition chamber 8 is preferably isolated from the outside environment via an interlock chamber 14. The drum is first fed into the interlock chamber 14 through an interlock chamber door 16 which, in the preferred embodiment, is a sliding door. The drum 6 is fed into the interlock chamber 14 using a drum conveyor 18; however, any other conventional device may be used (FIG. 1). Once the drum 6 is inside the interlock chamber 14 the interlock chamber door 16 is closed to isolate the interlock chamber 14 from the outside environment. The drum 6 is then moved from the interlock chamber and into the transition chamber 8 with the lift 10 (FIG. 1). In the preferred embodiment, the interlock chamber 14 is disposed below the transition chamber 8, however, the interlock chamber 14 may be configured in any position relative to the transition chamber 8. For example, the interlock chamber may be disposed above the transition chamber, and a vacuum holder or grapple may be used to lower the drum into the transition chamber.

The interlock chamber 14 advantageously permits preparing a further drum 6A during the time that a previous drum is being disposed of. While a first drum 6 is being disposed of, the interlock chamber is evacuated or purged through a port 20 with a vacuum pump or compressor (not shown) to remove any contaminants which may have entered from the transition chamber 8 during the time the drum was loaded into the transition chamber. The evacuated or purged gas is preferably fed into the treatment chamber through a feed line 22. The interlock chamber 14 is then backfilled with air. The drum feeder of the present invention may also operate without an interlock chamber by evacuating or purging the transition chamber after each use, for example, through a clean-out port 24. It is preferred, however, to include an interlock chamber to increase the rate of drum disposal.

The transition chamber is preferably contained within a spool valve 26. When a 55 gallon drum is used it is preferred to use a 46" spool valve. The spool valve 26 has an inner element 28 which is rotatable with respect to a housing 30. The inner element 28 has two ports 32, disposed 180° from one another, and two seals 34, also disposed 180° from one another. The housing has four outlets 36, 38, 40, 42 oriented 90° from one another. The seals 34 are configured to block the outlets and prevent gas or other material from passing therethrough. As shown in FIG. 1, the seals 34 are positioned against a first outlet 36, which leads to the entrance port, and a third outlet 40. A drum manipulator 60, which is described in greater detail below, is positioned adjacent the third outlet. Rotation of the inner element 28 to the position of FIG. 3 couples the first and third outlets through the inner element ports 32. In the feed position of FIG. 3, the transition chamber 8 is coupled to the entrance port 4 of the treatment chamber 2.

Figure 2:
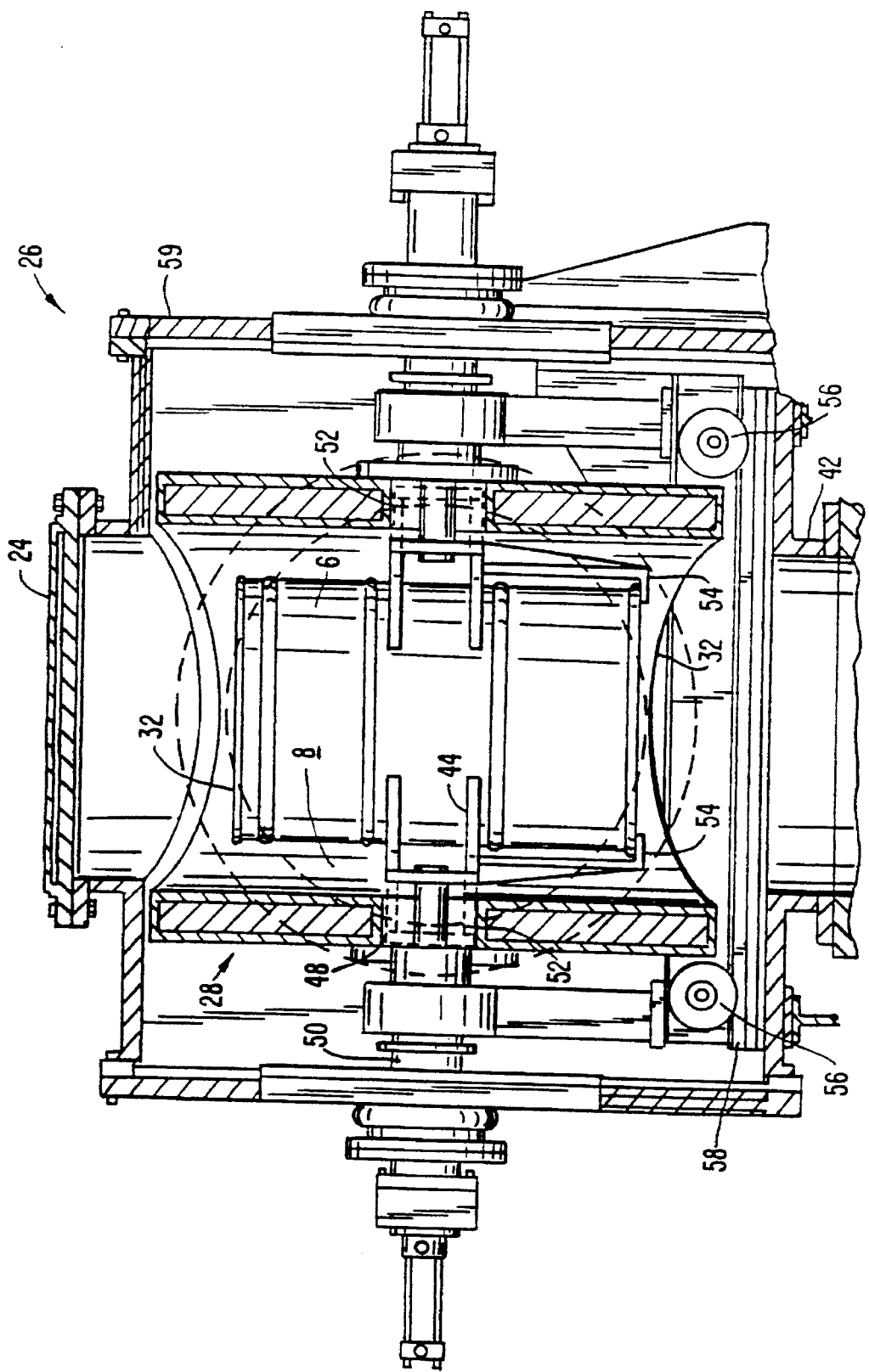
FIG. 2 is a vertical cross section of spool valve of FIG. 1 along line II—II.

Referring to FIG. 2, the spool valve 26 preferably includes a pair of drum grips 44 are configured to grasp the drum 6. The drum grips 44 are movable between the solid-line working position and the dotted-line feed position 48. The drum grips 44 are preferably positioned within central pivots 50 of the spool valve 26. The inner element 28 includes cutout portions 52 to receive the retracted drum grips 44. The drum grips 44 are preferably hydraulically actuated and include forks 54 which provide vertical support.

Figure 3:
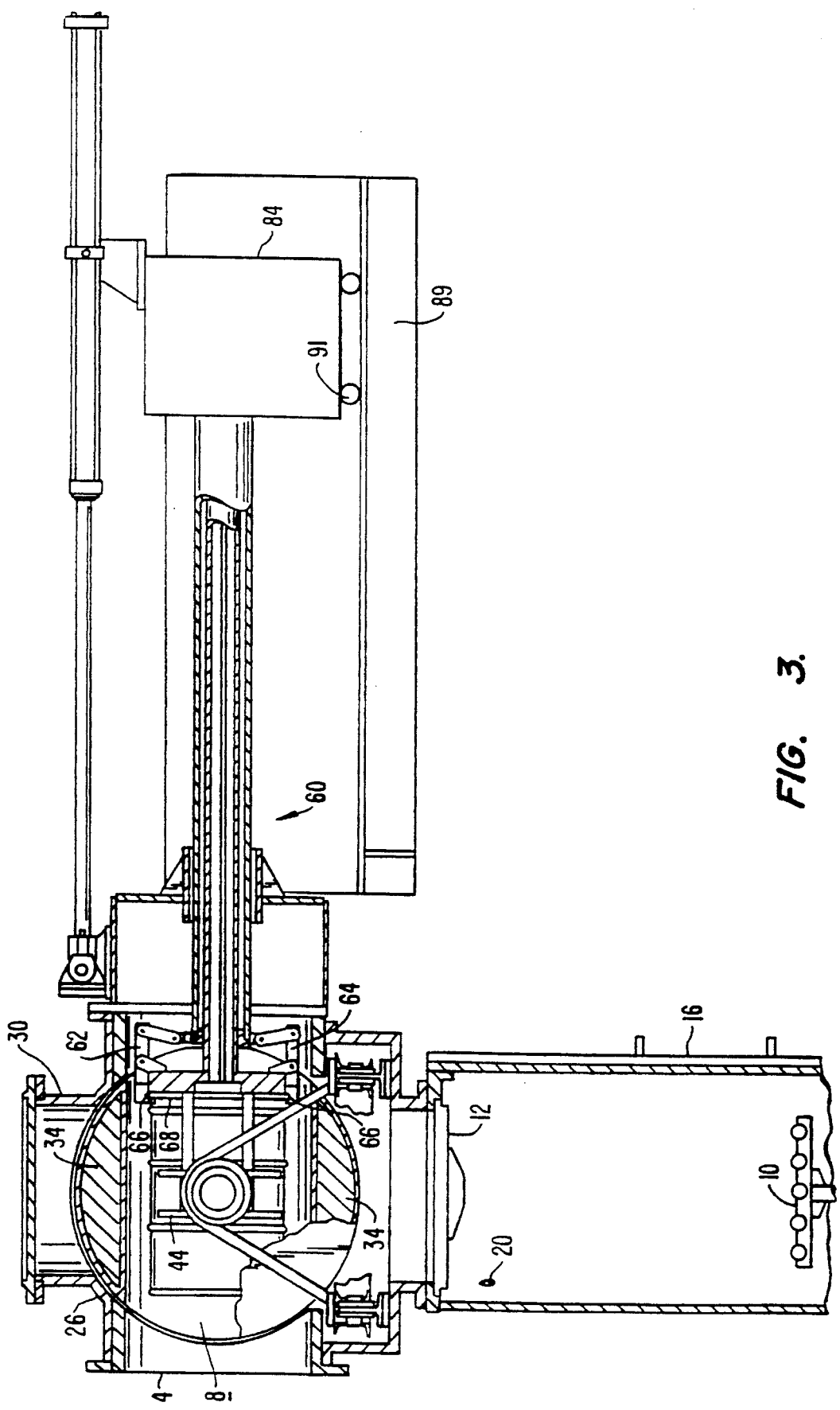
FIG. 3 is a vertical section of the drum feeding apparatus with a spool valve in a feed position and the jaws of a drum manipulator in a closed position around a raised lip of a drum.

The drum grips 44 are rotatably coupled to the inner element 28 so that the drum grips 44 rotate together with the inner element with respect to the housing. The drum is initially fed into the transition chamber in an upright position (FIG. 1) and the drum grips 44 are actuated to grasp the drum. The inner element 28 is then rotated so that the drum rotates to a horizontal position (FIG. 3). The inner element 28 and drum grips may be rotated using any conventional mechanism. For example, the inner element may include a worm gear, a sprocket which engages a chain, or a lever which is actuated by a hydraulic cylinder.

The inner element 28 of the spool valve is preferably mounted on wheels 56 which ride on a track 58. If maintenance or cleaning of the inner element is necessary, a side 59 of the housing 30 is opened and the inner element is rolled out of the housing 30 on the track 58.

Once the drum is in the feed position of FIG. 3, the drum 6 is displaced from the transition chamber 8 using a drum manipulator 60. The drum may also be displaced with a conventional conveyor, grapple, vacuum holder, or slide. The drum manipulator 60 has first and second jaws 62, 64 which are movable between open (FIG. 1) and closed (FIG. 3) positions. The jaws 62, 64 preferably include a recess 66 sized to engage a raised lip 68 of the drum when the jaws are in the closed position.

Figure 5:
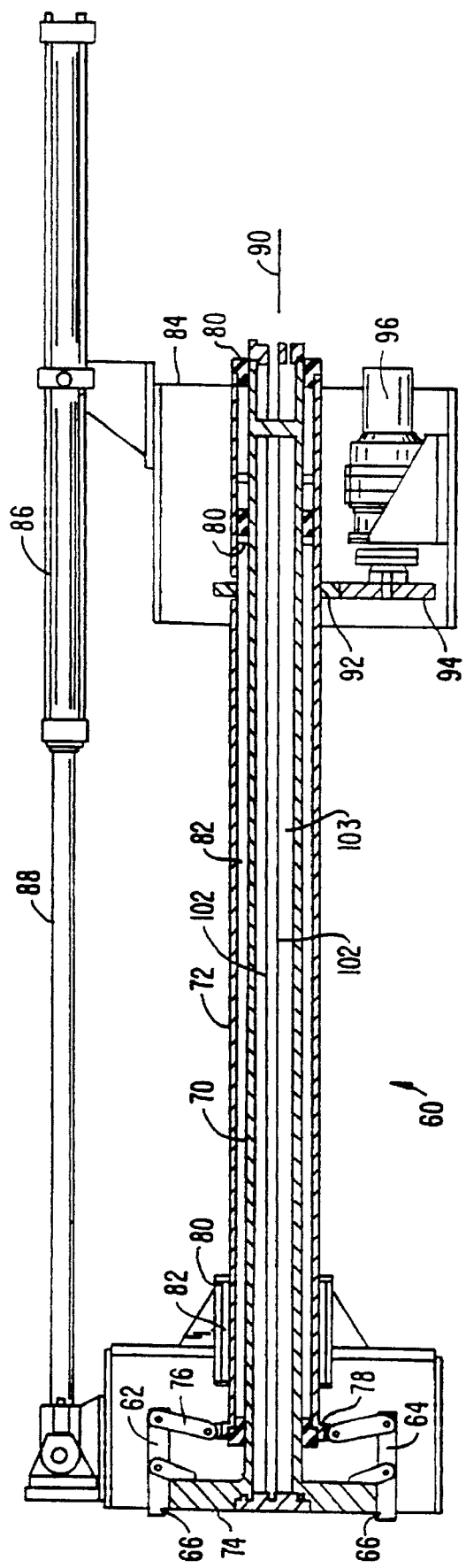
FIG. 5 is a cross section of the drum manipulator.

Referring to FIG. 5, the jaws 62, 64 of the drum manipulator 60 are actuated upon relative longitudinal movement between an inner member 70 and an outer member 72. The inner and outer members are preferably cylindrical and the inner member 70 is at least partially disposed within the outer member 72. The outer member 72 engages a slide bearing 82. The first and second jaws 62, 64 are pivotally coupled to a contact plate 74, which is described in greater detail below, at a first end and pivotally coupled to a link 76 at a second end. The link 76 is also pivotally coupled to a flange 78 which is attached to the outer member 72. As shown in FIG. 1, the jaws 62, 64 are in the open position and the inner member 70 is in a first position relative to the outer element 72. When the inner member is moved relative to the outer member to the position of FIG. 3, which moves the contact plate 74 farther from the flange 78, the jaws move from the open position to the closed position.

A number of seals 80 are positioned between the inner and outer members 70, 72 and between the outer member 72 and housing 30 to prevent hazardous gas or material from escaping therebetween. An annular space 83 between the inner and outer members 70, 72 is preferably water cooled to protect the seals 80 and bearing 82 from the heat of the treatment chamber. An advantage of the preferred drum manipulator 60 is that standard shaft seals may be used when the inner and outer members are cylindrical.

Figure 4:
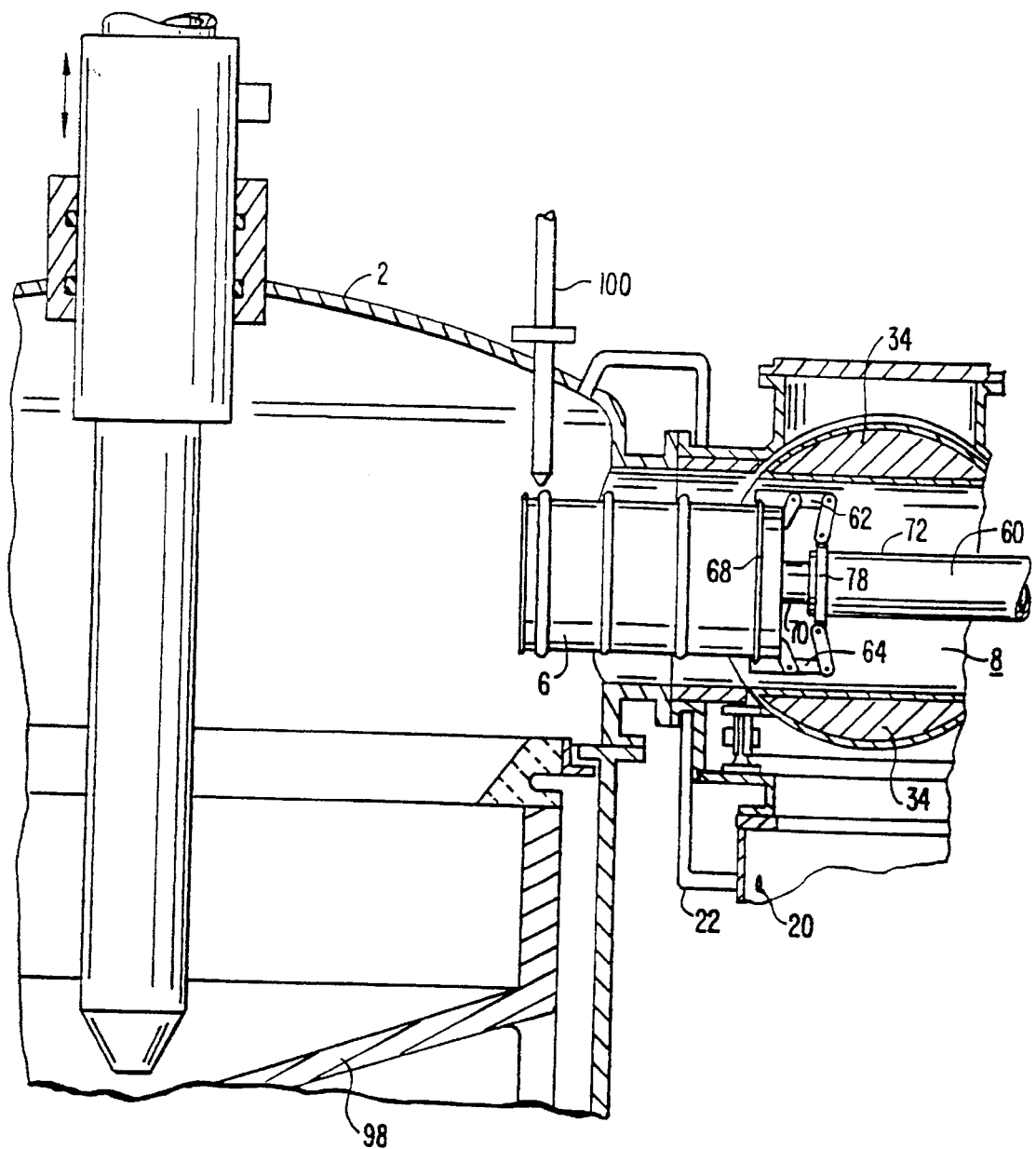
FIG. 4 is a vertical section of a treatment chamber with a drum in position for cutting by a cutting device.

The jaws of the drum manipulator are movable in a longitudinal direction between the loading position (FIG. 3) and the working position (FIG. 4). The drum manipulator 60 is attached to an enclosure 84 which is attached to a hydraulically actuated cylinder 86. Enclosure 84 preferably has wheels 91 which engage a guide mechanism 89 to provide support for the drum manipulator 60 (FIG. 3). The enclosure 84 may also simply slide on the guide mechanism 89. The cylinder 86 is movable along a rod 88 for moving the drum manipulator 60 between the loading and working positions. The jaws are also rotatable about a longitudinal axis 90. A drive wheel 92 is attached to the outer member 72 and engages a drive sprocket 94. The drive sprocket 94, in turn, is drivingly coupled to a motor 96.

After the jaws of the drum manipulator 60 have been closed around the drum 6 as shown in FIG. 3, the drum 6 is moved toward the treatment chamber 2 and, preferably, to a position inside the treatment chamber 2. If the treatment chamber 2 is a plasma arc treatment chamber the drum 6 is preferably positioned over a hearth 98, either rotatable or static, so that the material contained therein drops into the hearth 98. The drum 6 may also be displaced over a slide, conveyor or other transport mechanism which feeds the material into the treatment container. It is preferred to position the drum 6 within the treatment chamber 2 so that an additional transport mechanism is not required.

Once the drum 6 is in the working position of FIG. 4, a cutting device 100 is used to cut the drum open. The cutting device 100 is preferably a plasma torch but may be any conventional cutting device including an oxyacetylene torch or a high pressure liquid abrasive jet. The drum manipulator 60 is preferably computer controlled so that the drum is cut into a desired shape and/or number of pieces. For example, the drum 6 may be cut into a continuous ribbon or a number of cylindrical sections. The drum manipulator 60 may also be used for controlled unloading of the hazardous waste through controlled cutting, rotation and longitudinal displacement of the drum. After the drum 6 has been cut into the desired shape and/or number of pieces, the jaws are moved to the open position so that the end of the drum 6 is dropped into the treatment chamber 2 thereby disposing of the entire drum.

When the treatment chamber 2 operates at high temperatures, the contact plate 74 is preferably cooled so that during manipulation of the drum, the drum does not melt and begin to flow and fall from the grasp of the drum manipulator 60. The preferred contact plate 74 is substantially cylindrical and sized to engage an end of the drum. Referring to FIG. 5, the contact plate 74 is water cooled through channels 102 extending through the inner member 70. Cooling water returns through an annular passage 103 between the channel 102 and inner member 70. Water inlet and outlet are effected by a rotary water joint (not shown) suitably mounted to the inner member 70 at the end opposite the contact plate 74. The contact plate may also include conduits (not shown) for distributing cooling liquid throughout the contact plate 74. The spool valve 26, transition chamber 8, interlock chamber 14 and the associated doors are also preferably water cooled and insulated when the treatment chamber operates at high temperatures.

Modification and variation can be made to the disclosed embodiments without departing from the subject of the invention as defined by the following claims. For example, the transition chamber may include a number of doors rather than being contained within a spool valve, the drum manipulator may grasp a midsection of the drum rather than an end of the drum, and the treatment chamber may be a chemical treatment chamber rather than a plasma arc treatment chamber.

What is claimed is:

1. A drum manipulator for grasping a drum, comprising:

an outer member defining a longitudinal axis;

an inner member having proximal and distal ends and at least partially disposed within the outer member, the inner and outer members being movable relative one another in the longitudinal direction between a first position and a second position;

first and second jaws for grasping the drum, the jaws being coupled to the outer and inner members and movable between an open position and a closed position;

a contact plate attached to the distal end of the inner member and disposed to contact a portion of the drum when the jaws are in the closed position;

a fluid conduit having an inlet adapted for receiving a coolant fluid and an outlet communicating with the contact plate for convective cooling of the contact plate;

means for displacing the grasping means; and means for coupling movement of the grasping means between the open and closed positions and movement of the inner member between the first and second positions.

2. The drum manipulator of claim 1, wherein:

the drum comprises a generally cylindrical sidewall and an end having a raised lip extending radially outward from the generally cylindrical sidewall; and the grasping means engages the raised lip of the drum.

3. The drum manipulator of claim 2, wherein:

the first and second jaws each have a recess configured to engage the raised lip of the drum, the first and second jaws being spaced apart from the raised lip in the open position and engaging the lip in the closed position.

4. The drum manipulator of claim 1, wherein:

the displacing means is configured to move the drum in the direction of the longitudinal axis.

5. The drum manipulator of claim 1 further comprising:

means for rotating the grasping means.

6. The drum manipulator of claim 5, wherein:

the rotating means comprises a drive wheel attached to the outer member; and a drive sprocket drivingly coupled to a motor and engaging the drive wheel for rotating the outer member.

7. The drum manipulator of claim 1, wherein:

the coupling means comprises a link pivotally coupled to the outer member and pivotally coupled to the first jaw.

8. The drum manipulator of claim 1, further comprising:

first and second link members pivotally coupling the contact plate to the first and second jaws, respectively.

9. The drum manipulator of claim 8, wherein the link members are positioned to pivot the first and second jaws into the closed position when the inner member, and the contact plate therewith, moves into the first position.

10. The drum manipulator of claim 9 wherein the contact plate defines a distal contact surface positioned to contact the drum when the jaws are in the closed position.

11. A drum manipulator for grasping a drum, comprising:

an outer member;

an inner member disposed within the outer member and defining an annular space therebetween, the inner and outer members being movable relative one another between a first position and a second position;

first and second jaws for grasping the drum, the jaws being coupled to the outer and inner members and movable between an open position and a closed position;

one or more seals positioned within the annular space to inhibit the passage of fluid therethrough;

means for displacing the grasping means; and means for coupling movement of the grasping means between the open and closed positions and movement of the inner member between the first and second positions.

* * * * *